United States Patent
Katsuyama

(10) Patent No.: US 8,398,548 B2
(45) Date of Patent: Mar. 19, 2013

(54) ULTRASOUND DIAGNOSTIC APPARATUS AND ULTRASOUND DIAGNOSTIC METHOD

(75) Inventor: Kimito Katsuyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 616 days.

(21) Appl. No.: 12/585,736

(22) Filed: Sep. 23, 2009

(65) Prior Publication Data

US 2010/0076313 A1  Mar. 25, 2010

(30) Foreign Application Priority Data

Sep. 25, 2008  (JP) ................. 2008-245520

(51) Int. Cl.
*A61B 8/00* (2006.01)

(52) U.S. Cl. ........ 600/437; 600/443; 600/445; 600/446; 600/447; 600/459

(58) Field of Classification Search .................. 600/437, 600/443, 445, 446, 447, 459
See application file for complete search history.

(56) References Cited

U.S. PATENT DOCUMENTS

| | | | |
|---|---|---|---|
| 5,279,301 A | | 1/1994 | Tsukaya et al. |
| 5,566,675 A | * | 10/1996 | Li et al. ........................ 600/459 |
| 5,664,572 A | | 9/1997 | Kishimoto |
| 6,135,962 A | | 10/2000 | Bashford et al. |
| 6,508,770 B1 | | 1/2003 | Cai |
| 2006/0241431 A1 | | 10/2006 | Kamiyama |
| 2006/0241456 A1 | * | 10/2006 | Karasawa ..................... 600/447 |
| 2008/0188751 A1 | | 8/2008 | Sato |

FOREIGN PATENT DOCUMENTS

| | | |
|---|---|---|
| EP | 1715360 A2 | 10/2006 |
| EP | 1715360 A3 | 10/2006 |
| JP | 04-236952 | 8/1992 |
| JP | 07-008487 | 1/1995 |
| JP | 9-94248 | 4/1997 |
| JP | 2000-300561 | 10/2000 |
| JP | 2003-061964 | 3/2003 |
| JP | 2006-305337 | 11/2006 |
| JP | 2008-188235 | 8/2008 |

OTHER PUBLICATIONS

Anderson et al., The detection of breast . . . , Journal of the Acoustical Society of America, Jan. 1, 1997, pp. 29-39, vol. 101, No. 1, Acoustical Society of America.

* cited by examiner

*Primary Examiner* — Tse Chen
*Assistant Examiner* — Joel Lamprecht
(74) *Attorney, Agent, or Firm* — Jean C. Edwards, Esq.; Edwards Neils PLLC

(57) ABSTRACT

In an ultrasound diagnosis, the inventor has found a characteristic that coincidence of RF data after matching addition or amplitude image data at the small opening are different between those of an isolated point (minute structure), a continuous surface, and a speckle. On the basis of the characteristic, an ultrasound diagnostic apparatus and method which can distinguish and extract the isolated point, the continuous surface, and the speckle and determine a tissue property are provided.

24 Claims, 9 Drawing Sheets

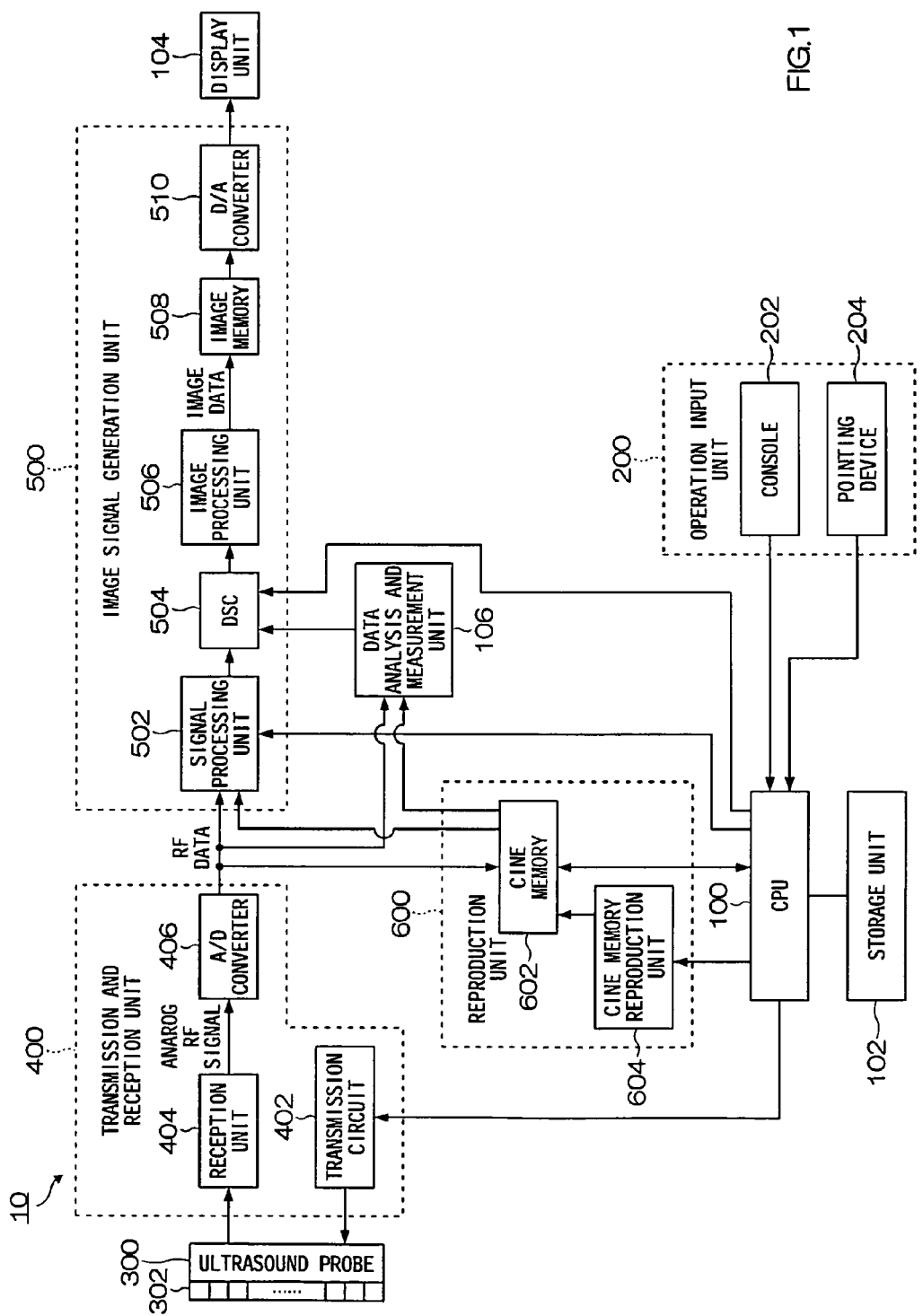

FIG.3A
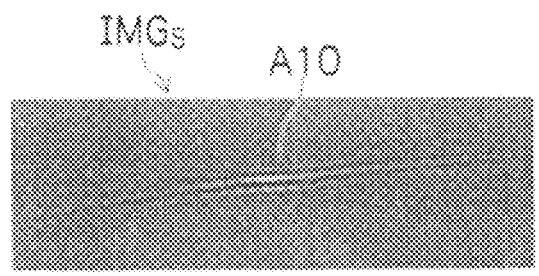
FIG.3B  FIG.3C  FIG.3D
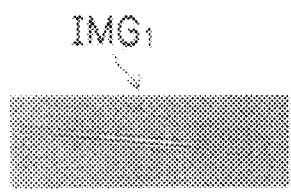 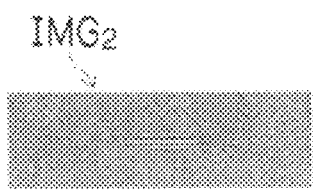 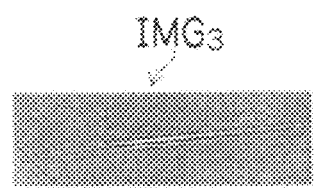
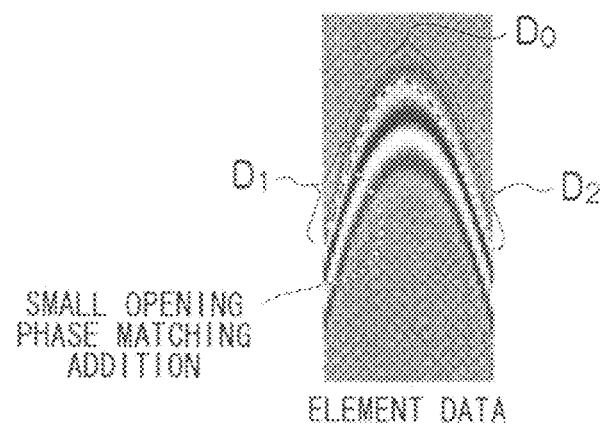
FIG.3E

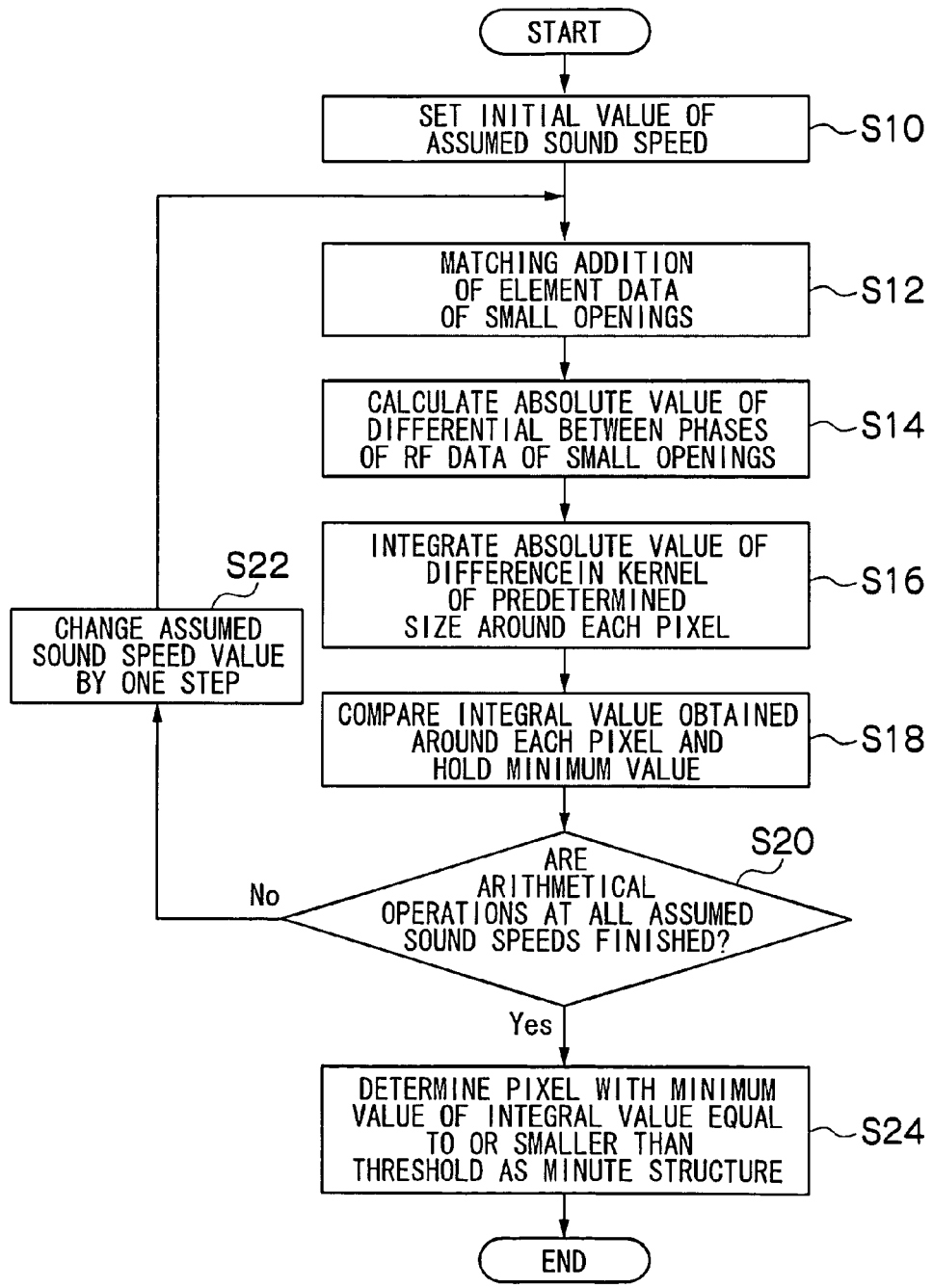

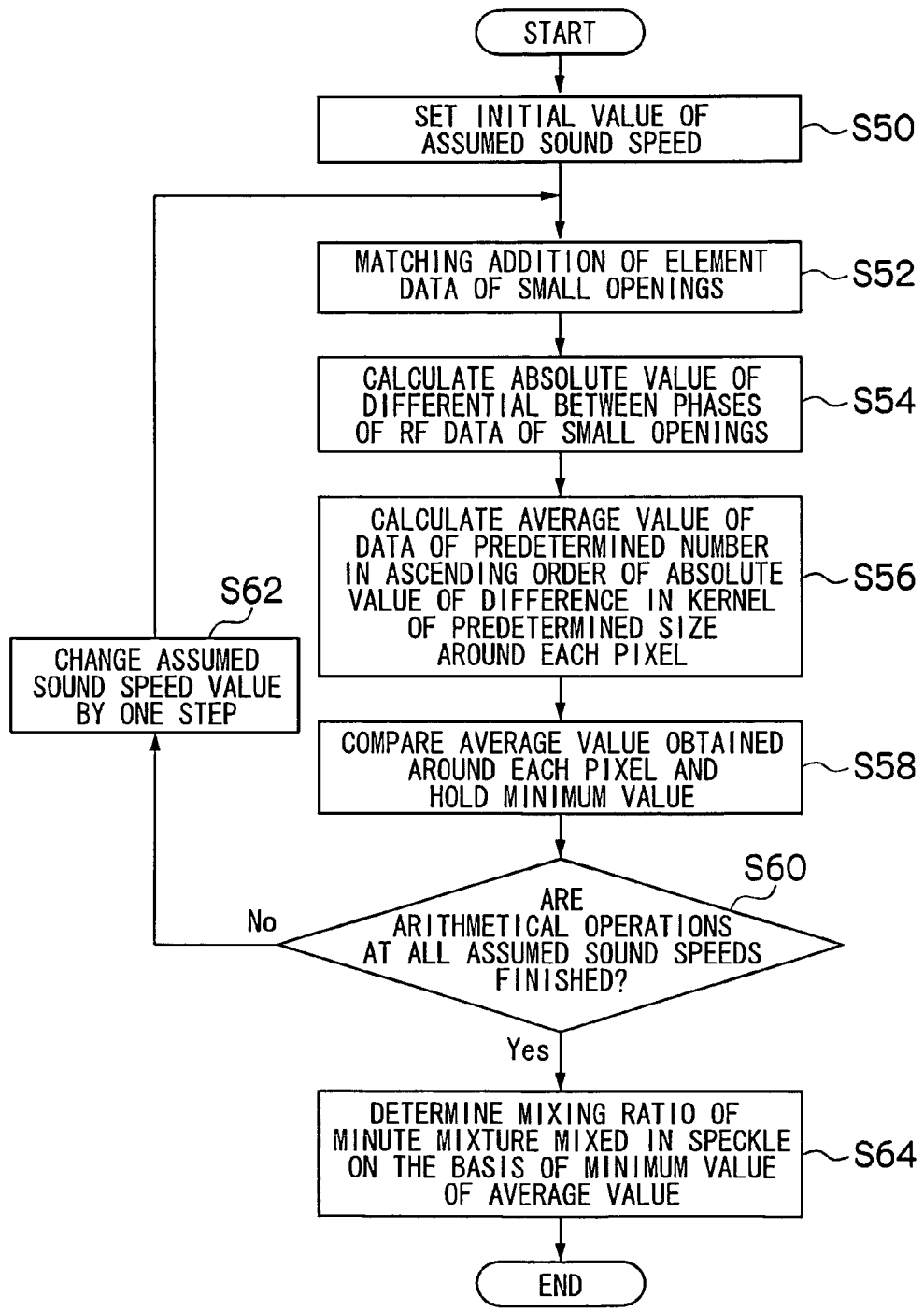

FIG.8A
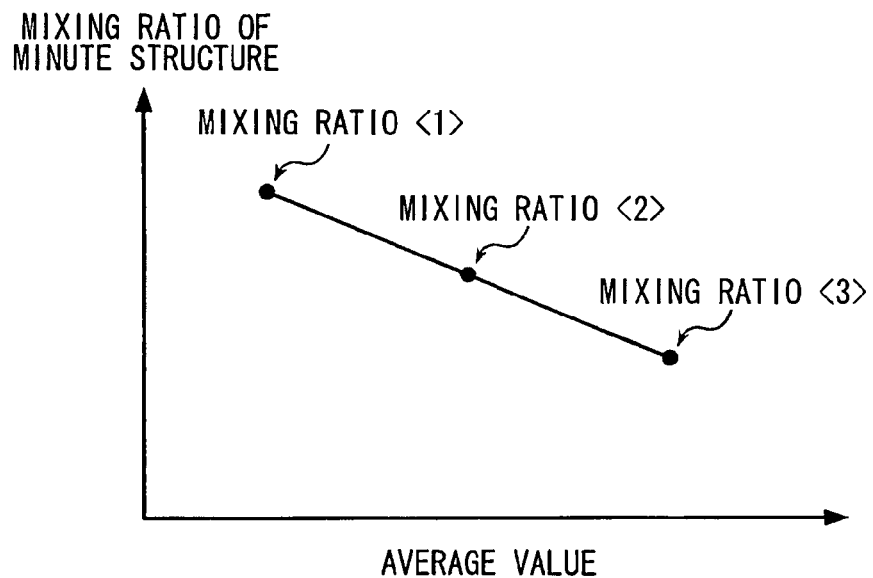
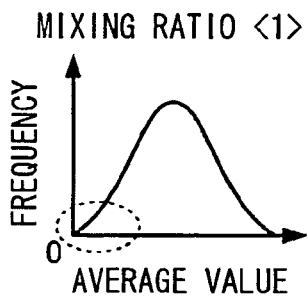
FIG.8B
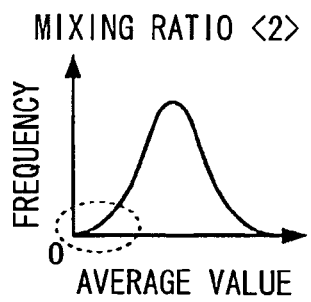
FIG.8C
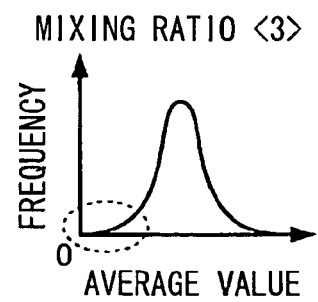
FIG.8D

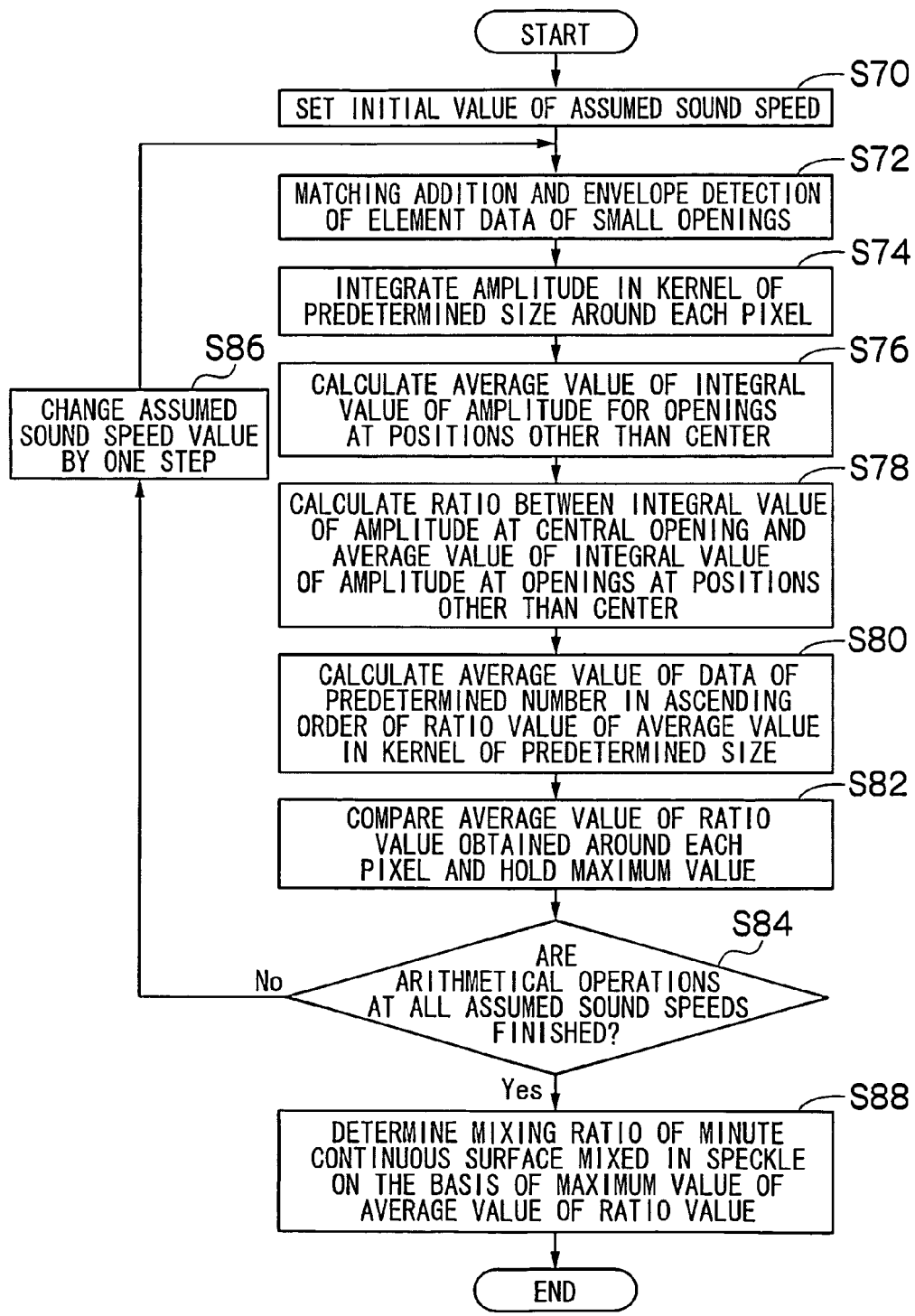

ULTRASOUND DIAGNOSTIC APPARATUS AND ULTRASOUND DIAGNOSTIC METHOD

CROSS-REFERENCE TO RELATED APPLICATIONS

The present application claims priority from Japanese Patent Application No. 2008-245520, filed Sep. 25, 2008, the contents of which are herein incorporated by reference in their entirety.

BACKGROUND OF THE INVENTION

1. Field of the Invention

The present invention relates to an ultrasound diagnostic apparatus and an ultrasound diagnostic method, and more particularly to an ultrasound diagnostic apparatus and an ultrasound diagnostic method for taking and displaying an ultrasound image of a subject using ultrasound.

2. Description of the Related Art

Conventionally, a technique has been proposed of analyzing a property of a reflector such as a minute structure (for example, a calcified region in a breast), a continuous surface, or a speckle included in a subject, and enhancing or suppressing a display of the reflector in an ultrasound image on the basis of the reflector property in an ultrasound image processing. Proposed techniques of distinguishing a reflector include, for example, a technique of distinguishing between reflectors by differences in value or shape of amplitude information of ultrasound (for example, Japanese Patent Application Laid-Open Nos. 2003-61964, 7-8487 and 2000-300561), or a technique of noting the manner of change in amplitude value between frames (for example, Japanese Patent Application Laid-Open No. 9-94248). Also, Japanese Patent Application Laid-Open No. 2006-305337 discloses a technique of extracting minute calcification by performing a CFAR (Contrast False Alarm Rate) processing of removing a speckle pattern from a B mode image and an MIP (Maximum Intensity Projection) processing in ultrasound diagnosis of a breast.

SUMMARY OF THE INVENTION

As described above, the technique of extracting a minute structure on the basis of the minute structure being visualized as an isolated high echo in an amplitude image has been proposed in the conventional ultrasound diagnosis. However, in the amplitude image, a part where there are intermittent speckles (interference fringes due to random interference of ultrasound) or intermittent continuous surfaces (planar regions with constant acoustic impedance) is also visualized as a high echo, and thus it is difficult to distinguish the minute structure in the subject from the speckles or the like and extract the minute structure.

The present invention is achieved in view of these circumstances, and has an object to provide an ultrasound diagnostic apparatus and an ultrasound diagnostic method that can precisely distinguish between a minute structure, a continuous surface, and a speckle included in a subject.

To solve the above described problems, a first aspect of the present invention provides an ultrasound diagnostic apparatus including: an ultrasound probe including a plurality of ultrasound transducers which transmit ultrasound to a subject and receive the ultrasound reflected by the subject to output an element data; an arithmetical operation device which performs matching addition of element data of a plurality of small openings obtained by dividing an opening provided in the ultrasound probe on the basis of the element data output from the ultrasound transducers; and a determination device which determines a property of a reflector which reflects the ultrasound in the subject on the basis of at least one of RF data obtained by the matching addition of the element data of the small openings and an amplitude image.

A second aspect of the present invention, the determination device determines a region where phases of the RF data obtained by the matching addition of the element data of the small openings substantially coincide with each other, as a minute structure in the ultrasound diagnostic apparatus of the first aspect.

A third aspect of the present invention is such that the determination device determines a region where phases of the RF data obtained by the matching addition of the element data of the small openings substantially coincide with each other, and where the phase of the RF data or a phase difference in a distance direction of the ultrasound probe changes in a scanning direction or the distance direction by a predetermined value or less irrespective of positions of the small openings, as a minute structure in the ultrasound diagnostic apparatus of the first aspect.

A fourth aspect of the present invention is such that the determination device determines a region where an amplitude at a small opening located at a center of a predetermined region of the element data is larger by a predetermined value or more than an amplitude at small openings at positions other than the center, as a continuous surface in the ultrasound diagnostic apparatus of the first to third aspects.

A fifth aspect of the present invention is such that the determination device determines a region where an amplitude at a small opening located at a center of a predetermined region of the element data is larger by a first predetermined value or more than an amplitude at small openings at positions other than the center, and where the phase of the RF data of the small opening located at the center or the phase difference in the distance direction of the ultrasound probe changes in the scanning direction or the distance direction by a second predetermined value or less, as a continuous surface in the ultrasound diagnostic apparatus of the first to third aspects.

A sixth aspect of the present invention is such that the determination device determines a region where the amplitude or the RF data randomly changes irrespective of the positions of the small openings, as a speckle in the ultrasound diagnostic apparatus of the first to fifth aspects.

A seventh aspect of the present invention is such that the determination device determines a mixing ratio of a minute structure included in the speckle on the basis of the RF data obtained by the matching addition of the element data of the small openings or the amplitude image in the ultrasound diagnostic apparatus of the sixth aspects.

An eighth aspect of the present invention is such that the determination device determines a mixing ratio of a continuous surface included in the speckle on the basis of the RF data obtained by the matching addition of the element data of the small openings or the amplitude image in the ultrasound diagnostic apparatus of the sixth or seventh aspect.

A ninth aspect of the present invention further includes a display device which displays a determination result of a property of the reflector in the ultrasound diagnostic apparatus of the first to eighth aspects.

A tenth aspect of the present invention is such that the display device displays the determination result of the property of the reflector in a manner that the determination result is superimposed on the amplitude image or placed with the amplitude image side by side in the ultrasound diagnostic apparatus of the ninth aspect.

An eleventh aspect of the present invention further includes a display mode switching device which switches a display mode between a first display mode in which the amplitude image is displayed alone and a second display mode in which the determination result of the property of the reflector is displayed in the ultrasound diagnostic apparatus of the ninth or tenth aspect.

A twelfth aspect of the present invention provides an ultrasound diagnostic method including: an arithmetical operation step for performing matching addition of element data of a plurality of small openings obtained by dividing an opening provided in a ultrasound probe on the basis of element data output from the ultrasound probe, the ultrasound probe including a plurality of ultrasound transducers which transmit ultrasound to a subject and receive the ultrasound reflected by the subject to output the element data; and a determination step for determining a property of a reflector which reflects the ultrasound in the subject on the basis of at least one of RF data obtained by the matching addition of the element data of the small openings and an amplitude image.

A thirteenth aspect of the present invention is such that a region where phases of the RF data obtained by the matching addition of the element data of the small openings substantially coincide with each other is determined as a minute structure in the determination step in the ultrasound diagnostic method of the twelfth aspect.

A fourteenth aspect of the present invention is such that a region where phases of the RF data obtained by the matching addition of the element data of the small openings substantially coincide with each other, and where the phase of the RF data or a phase difference in a distance direction of the ultrasound probe changes in a scanning direction or the distance direction by a predetermined value or less irrespective of positions of the small openings is determined as a minute structure in the determination step in the ultrasound diagnostic method of the twelfth aspect.

A fifteenth aspect of the present invention is such that a region where an amplitude at a small opening located at a center of a predetermined region of the element data is larger by a predetermined value or more than an amplitude at small openings at positions other than the center is determined as a continuous surface in the determination step in the ultrasound diagnostic method of the twelfth to fourteenth aspects.

A sixteenth aspect of the present invention is such that a region where an amplitude at a small opening located at a center of a predetermined region of the element data is larger by a first predetermined value or more than an amplitude at small openings at positions other than the center, and where the phase of the RF data of the small opening located at the center or the phase difference in the distance direction of the ultrasound probe changes in the scanning direction or the distance direction by a second predetermined value or less is determined as a continuous surface in the determination step in the ultrasound diagnostic method of the twelfth to fourteenth aspects.

A seventeenth aspect of the present invention is such that a region where the amplitude or the RF data randomly changes irrespective of the positions of the small openings is determined as a speckle in the determination step in the ultrasound diagnostic method of the twelfth to sixteenth aspects.

An eighteenth aspect of the present invention further includes a step for determining a mixing ratio of a minute structure included in the speckle on the basis of the RF data obtained by the matching addition of the element data of the small openings or the amplitude image in the ultrasound diagnostic method of the seventeenth aspects.

A nineteenth aspect of the present invention further includes a step for determining a mixing ratio of a continuous surface included in the speckle on the basis of the RF data obtained by the matching addition of the element data of the small openings or the amplitude image in the ultrasound diagnostic method of the seventeenth or eighteenth aspect.

A twentieth aspect of the present invention further includes a display step for displaying a determination result of a property of the reflector on a display device in the ultrasound diagnostic method of the twelfth to nineteenth aspect.

A twenty first aspect of the present invention is such that the determination result of the property of the reflector is displayed in a manner that the determination result is superimposed on the amplitude image or placed with the amplitude image side by side in the display step in the ultrasound diagnostic method of the twentieth aspect.

An twenty second aspect of the present invention further includes a display mode switching step for receiving an instruction input from an operator to switch a display mode between a first display mode in which the amplitude image is displayed alone and a second display mode in which the determination result of the property of the reflector is displayed, and switching the display mode in the ultrasound diagnostic method of the twentieth or twenty first aspect.

According to the present invention, matching addition of the element data of the small openings is performed, the differences in characteristics between the minute structure, the continuous surface, and the speckle in the RF data and the amplitude image are used to enable to distinguish the minute structure, the continuous surface, and the speckle, which have been difficult to distinguish by a conventional technique based on an amplitude value or a shape of an amplitude image, and to determine a tissue property.

BRIEF DESCRIPTION OF THE DRAWINGS

FIG. 1 is a block diagram of an ultrasound diagnostic apparatus according to a first embodiment of the present invention;

FIGS. 3A to 3E illustrate a phase matching addition processing of element data for each small opening;

FIG. 5 is a flowchart showing a determination processing of a minute structure;

FIG. 7 is a flowchart showing a calculation process of a mixing ratio of a minute structure included in the speckle;

FIG. 8A is a graph showing a relationship between the mixing ratio of the minute structure and an average value of an absolute value of difference;

FIGS. 8B to 8D are graphs showing a relationship between the mixing ratio of the minute structure and a number of data (data count); and FIG. 9 is a flowchart showing a calculation process of a mixing ratio of a minute continuous surface included in the speckle.

DETAILED DESCRIPTION OF THE PREFERRED EMBODIMENTS

Figure 2A:
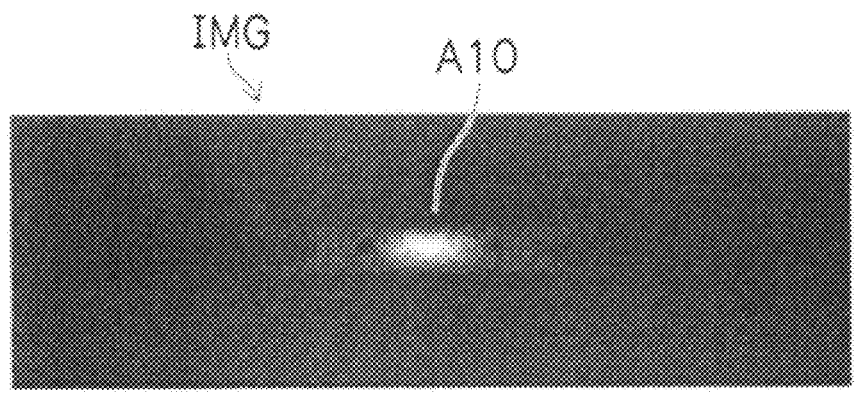
FIGS. 2A and 2B illustrate a phase matching addition processing of element data.

Now, preferred embodiments of an ultrasound diagnostic apparatus and an ultrasound diagnostic method according to the present invention will be described with reference to the accompanying drawings.

[Configuration of Ultrasound Diagnostic Apparatus]

FIG. 1 is a block diagram of an ultrasound diagnostic apparatus according to a first embodiment of the present invention.

An ultrasound diagnostic apparatus 10 in FIG. 1 is an apparatus that transmits an ultrasound beam from an ultrasound probe 300 to a subject OBJ, receives the ultrasound beam (ultrasonic echo) reflected by the subject OBJ, and generates and displays an ultrasound image from a detection signal of the ultrasonic echo.

A CPU (Central Processing Unit) 100 controls each block in the ultrasound diagnostic apparatus 10 according to an operation input from an operation input unit 200.

The operation input unit 200 is an input device that receives an operation input by an operator, and includes a console 202 and a pointing device 204. The console 202 includes a keyboard that receives an input of character information (for example, patient information), a display mode switch button for switching a display mode between a normal display mode in which an amplitude image (B (Brightness) mode image) is displayed alone and a determination result display mode in which a determination result (described later) of a property of a reflector is displayed, a freeze button for giving instruction to switch between a live mode and a freeze mode, a cine memory reproduction button for giving instruction to reproduce a cine memory, and an analysis and measurement button for giving instruction to analyze and measure an ultrasound image. The pointing device 204 is a device that receives an input of designation of a region on a screen of a display unit 104, for example, a trackball or a mouse. A touch panel may be used as the pointing device 204.

A storage unit 102 is a storage device that stores a control program for the CPU 100 to control each block in the ultrasound diagnostic apparatus 10, for example, a hard disk or a semiconductor memory.

The display unit 104 is, for example, a CRT (Cathode Ray Tube) display or a liquid crystal display, and displays an ultrasound image (moving image and still image) and various setting screens.

The ultrasound probe 300 is a probe to be abutted against the subject OBJ for use, and includes a plurality of ultrasound transducers 302 that constitute a one-dimensional or two-dimensional transducer array. The ultrasound transducer 302 transmits an ultrasound beam to the subject OBJ on the basis of a drive signal applied from a transmission circuit 402, and receives an ultrasound beam (ultrasonic echo) reflected by the subject OBJ to output an ultrasound detection signal.

The ultrasound transducer 302 includes a transducer having electrodes formed at opposite ends of a piezoelectric material (piezoelectric body). As the piezoelectric body included in the transducer, for example, piezoelectric ceramic such as PZT (Pb (lead) zirconate titanate) or a polymeric piezoelectric element such as PVDF (polyvinylidene difluoride) can be used. When an electric signal is sent to the electrode of the transducer to apply a voltage, the piezoelectric body expands or contracts, and the expansion and contraction of the piezoelectric body causes each transducer to generate ultrasound. For example, when a pulse-like electric signal is sent to the electrode of the transducer, pulse-like ultrasound is generated, and when a continuous wave electric signal is sent to the electrode of the transducer, continuous wave ultrasound is generated. Then, ultrasound generated from each transducer is synthesized to form an ultrasound beam. When each transducer receives ultrasound, the piezoelectric body in each transducer expands and contracts to generate an electric signal. The electric signal generated from each transducer is output to a reception circuit 404 as an ultrasound detection signal (hereinafter referred to as element data).

As the ultrasound transducers 302, a plurality of kinds of elements of different ultrasound conversion types may be used. For example, the transducer including the piezoelectric body is used as an element that transmits ultrasound, and an optical detection type ultrasound transducer may be used as an element that receives ultrasound. The optical detection type ultrasound transducer converts an ultrasound signal into an optical signal for detection, and is, for example, a Fabry-Perot resonator or a fiber Bragg grating.

Next, an ultrasound diagnosis process in the live mode will be described. The live mode is a mode in which an ultrasound image (moving image) obtained by abutting the ultrasound probe 300 against the subject OBJ to transmit and receive ultrasound is displayed, analyzed and measured.

When the ultrasound probe 300 is abutted against the subject OBJ, and ultrasound diagnosis is started by an instruction input from the operation input unit 200, the CPU 100 outputs a control signal to a transmission and reception unit 400, and starts transmitting an ultrasound beam to the subject OBJ and receiving an ultrasonic echo from the subject OBJ. The CPU 100 sets a transmitting direction of the ultrasound beam and a receiving direction of the ultrasonic echo for each ultrasound transducer 302.

Further, the CPU 100 selects a transmission delay pattern according to the transmitting direction of the ultrasound beam, and selects a reception delay pattern according to the receiving direction of the ultrasonic echo. The transmission delay pattern is pattern data of a delay time provided to a drive signal for forming an ultrasound beam in a desired direction by ultrasound transmitted from the plurality of ultrasound transducers 302. The reception delay pattern is pattern data of a delay time provided to a detection signal for extracting an ultrasonic echo from a desired direction by ultrasound received by the plurality of ultrasound transducers 302. The transmission delay pattern and the reception delay pattern are previously stored in the storage unit 102. The CPU 100 selects a transmission delay pattern and a reception delay pattern from the patters stored in the storage unit 102, and outputs a control signal to the transmission and reception unit 400 to perform control to transmit and receive ultrasound according to the selected transmission delay pattern and reception delay pattern.

The transmission circuit 402 generates a drive signal according to a control signal from the CPU 100, and applies the drive signal to the ultrasound transducer 302. At this time, the transmission circuit 402 delays the drive signal applied to each ultrasound transducer 302 on the basis of the transmission delay pattern selected by the CPU 100. The transmission circuit 402 adjusts (delays) timing of applying the drive signal to each ultrasound transducer 302 so that the ultrasound transmitted from the plurality of ultrasound transducers 302 forms an ultrasound beam. The timing of applying the drive signal may be adjusted so that ultrasound transmitted at one time from the plurality of ultrasound transducers 302 reaches the entire imaging region of the subject OBJ.

The reception circuit 404 receives and amplifies an ultrasound detection signal output from each ultrasound transducer 302. As described above, because of different distances between the respective ultrasound transducers 302 and an ultrasound reflection source in the subject OBJ, reflected waves reach the respective ultrasound transducers 302 at different times. The reception circuit 404 includes a delay circuit, and delays a detection signal (element data) output from each ultrasound transducers 302 by an amount corresponding to a difference (delay time) between reaching times of the reflected waves according to a sound speed (hereinafter referred to as an assumed sound speed) set on the basis of the reception delay pattern selected by the CPU 100 or distribution of the sound speed. Then, the reception circuit 404 performs matching addition of detection signals delayed by the delay time to perform a receiving focus process. When there is another ultrasound reflection source in a different position from an ultrasound reflection source $X_{ROI}$, an ultrasound detection signal from the different ultrasound reflection source reaches at a different time. Thus, the addition by the addition circuit causes phases of ultrasound detection signals from different ultrasound reflection sources to cancel each other out. Thus, the received signal from the ultrasound reflection source $X_{ROI}$ becomes the largest and comes into focus. The receiving focus process forms an acoustic ray signal (hereinafter referred to as an RF signal) with narrowed focus of an ultrasonic echo.

An A/D converter 406 converts an analog RF signal output from the reception circuit 404 into a digital RF signal (hereinafter referred to as RF data). The RF data includes phase information of a received wave (carrier wave). The RF data output from the A/D converter 406 is input to a signal processing unit 502 and a cine memory 602.

The cine memory 602 successively stores the RF data input from the A/D converter 406. The cine memory 602 stores information on a frame rate (for example, a depth of a reflection position of ultrasound, a density of scanning lines, a parameter indicating a width of field of view) input from the CPU 100 in association with the RF data.

The signal processing unit 502 corrects the RF data in attenuation due to a distance according to a depth of a reflection position of ultrasound by STC (Sensitivity Time gain Control), and then performs an envelope detection process of the RF data to generate a B mode image data (image data indicating an amplitude of an ultrasonic echo with brightness of a point.

The B mode image data generated by the signal processing unit 502 is obtained by a different scanning method from a normal television signal scanning method. Thus, a DSC (Digital Scan Converter) 504 converts (raster conversion) the B mode image data into normal image data (for example, image data by the television signal scanning method (NTSC (National Television System Committee in the United States) method)). An image processing unit 506 performs various necessary image processes (for example, a gradation processing) of image data input from the DSC 504.

An image memory 508 stores image data input from the image processing unit 506. A D/A converter 510 converts image data read from the image memory 508 into an analog image signal, and outputs the signal to the display unit 104. Thus, the ultrasound image (moving image) taken by the diagnostic apparatus 10 is displayed on the display unit 104.

In the embodiment, the detection signal subjected to the receiving focus process in the reception circuit 404 is the RF signal, but a detection signal that is not subjected to the receiving focus process may be an RF signal. In this case, the plurality of ultrasound detection signals output from the plurality of ultrasound transducers 302 are amplified by the reception circuit 404, the amplified detection signals, that is, the RF signals are A/D converted by the A/D converter 406 to generate RF data. Then, the RF data is supplied to the signal processing unit 502, and stored in the cine memory 602. The receiving focus process is performed by the signal processing unit 502 in digital form.

Next, a cine memory reproduction mode will be described. The cine memory reproduction mode is a mode in which an ultrasound diagnosis image is displayed, analyzed and measured on the basis of the RF data stored in the cine memory 602.

When the cine memory reproduction button on the console 202 is pushed, the CPU 100 switches an operation mode of the ultrasound diagnostic apparatus 10 to the cine memory reproduction mode. In the cine memory reproduction mode, the CPU 100 instructs a cine memory reproduction unit 604 to reproduce RF data designated by an operation input by an operator. The cine memory reproduction unit 604 reads the RF data from the cine memory 602 according to the instruction from the CPU 100, and transmits the read RF data to the signal processing unit 502 in the image signal generation unit 500. The RF data transmitted from the cine memory 602 is subjected to predetermined processes (the same processes as in the live mode) by the signal processing unit 502, the DSC 504, and the image processing unit 506 and converted into image data, and then output via an image memory 508 and the D/A converter 510 to the display unit 104. Thus, the ultrasound image (moving image or still image) based on the RF data stored in the cine memory 602 is displayed on the display unit 104.

When the freeze button on the console 202 is pushed while the ultrasound image (moving image) is displayed in the live mode or the cine memory reproduction mode, the ultrasound image displayed when the freeze button is pushed is displayed as a still image on the display unit 104. This allows the operator to display and observe a still image of a region of interest ROI.

When the measurement button on the console 202 is pushed, analysis and measurement designated by the operation input by the operator are performed. When the measurement button is pushed in each operation mode, a data analysis and measurement unit 106 obtains RF data before an image processing from the A/D converter 406 or the cine memory 602, and uses the RF data to perform analysis and measurement designated by the operator (for example, distortion analysis of a tissue part (diagnosis of hardness), measurement of blood flow, measurement of movement of the tissue part, or measurement of IMT (Intima-Media Thickness) value). Analysis and measurement results by the data analysis and measurement unit 106 are output to the DSC 504 in the image signal generation unit 500. The DSC 504 inserts the analysis and measurement results by the data analysis and measurement unit 106 into image data of the ultrasound image and outputs the data to the display unit 104. Thus, the ultrasound image and the analysis and measurement results are displayed on the display unit 104.

[Determination Processing of Minute Structure]

Next, a method of determining a minute structure will be described. The ultrasound diagnostic apparatus 10 according to the embodiment performs matching addition of element data obtained from small openings (for example, openings constituted by the ultrasound transducers 302 of ½, ⅓ to ⅕ the number of all elements of the ultrasound probe 300) on the element data, and determines a reflector property or a tissue property on the basis of RF data and an amplitude image of each matching addition result.

Figure 2B:
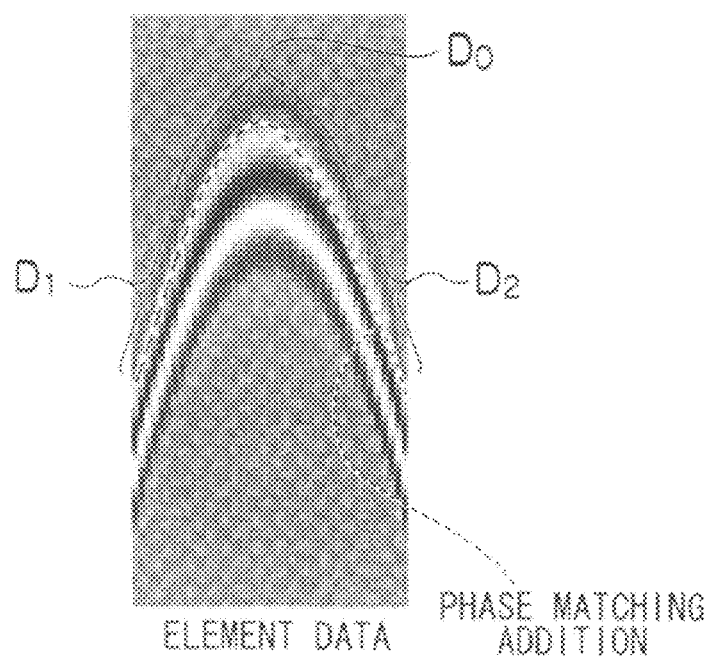
Figure 4C:
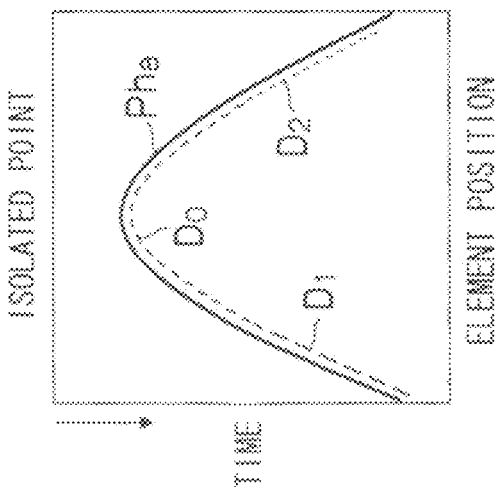
FIGS. 4A, 4B and 4C illustrate differences in coincidence of RF data or an amplitude image after matching addition at the small opening between an isolated point, a continuous surface, and a speckle.
Figure 4B:
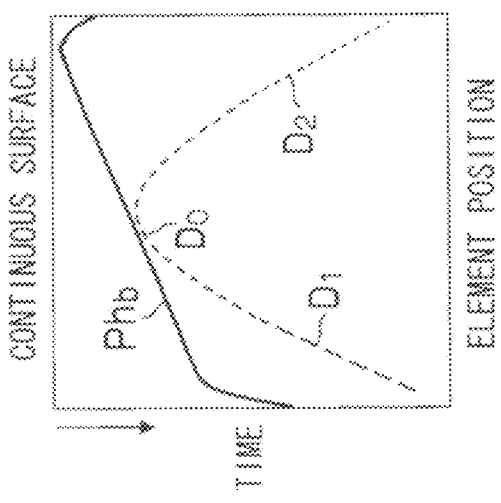
Figure 4A:
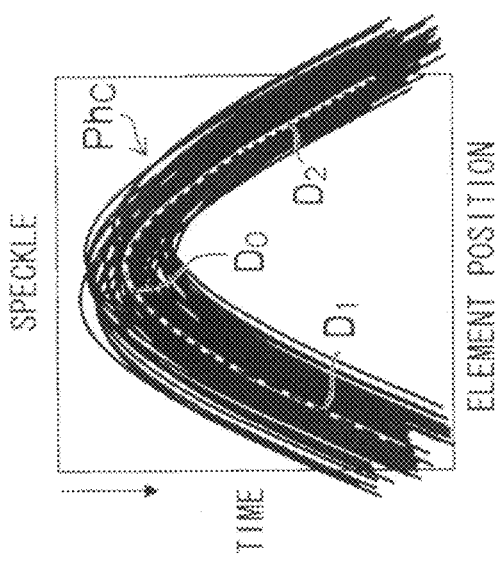

FIGS. 2A and 2B illustrate a phase matching addition processing of element data. FIGS. 3A to 3E illustrate a phase matching addition processing of element data for each small opening. FIGS. 2B and 3E show, with dashed line, element data (RF data) $D_0$, $D_1$ and $D_2$ corresponding to respective small openings which are obtained by dividing an opening. FIG. 2A shows an amplitude image IMG of phase matching addition result of element data $D_0$, $D_1$ and $D_2$ after envelope detection. FIGS. 3B, 3C and 3D show amplitude images $IMG_0$, $IMG_1$ and $IMG_2$ corresponding to element data $D_0$, $D_1$ and $D_2$, respectively. FIG. 3A shows an amplitude images $IMG_s$ and an isolated point A10 where phases of matching addition result of the element data (RF data) $D_0$, $D_1$ and $D_2$ match. FIGS. 4A, 4B and 4C illustrate differences in coincidence of RF data $D_0$, $D_1$ and $D_2$ or an amplitude image after matching addition at the small opening between an isolated point, a continuous surface, and a speckle. In FIGS. 4A, 4B and 4C, dashed lines indicate element data (RF data) $D_0$, $D_1$ and $D_2$ corresponding to respective small openings which are obtained by dividing an opening, and solid lines indicate amplitude image data $PH_a$, $PH_b$ and $PH_c$.

As shown in FIG. 2A, an isolated point is visualized as a region with a high amplitude value (high echo) in an amplitude image IMG. As shown in FIG. 2B, on element data $D_0$, an ultrasound echo from the isolated point is received while maintaining a transmission waveform with a time difference specific to the isolated point. Thus, as shown in FIG. 3E, when matching addition is performed of RF data (element data) obtained from the small openings on the ultrasound probe 300 in view of a delay specific to the isolated point, matching addition results at the small openings coincide with each other in terms of waveforms. In the isolated point, the transmission waveform is maintained on the element data, and thus a phase difference in a distance direction (a depth direction of the subject OBJ) of the RF data is uniform irrespective of positions of the small openings.

In the embodiment, the isolated point is extracted noting a characteristic that the phase difference between the RF data at respective small openings is small in the isolated point. According to the embodiment, an S/N ratio is increased and the isolated point can be extracted with high accuracy as compared with a conventional method of simply extracting a high echo region of an amplitude image.

As shown in FIG. 4A, in the isolated point, ultrasound is received while maintaining the transmission waveform with the time difference specific to the isolated point, and thus results of matching addition at the small openings in view of the delay specific to the isolated point coincide with each other in terms of waveforms. The transmission waveform is maintained on the element data, and thus the phase difference in the distance direction of the RF data is uniform irrespective of positions of the small openings.

As shown in FIG. 4B, in a continuous surface, there is a large amplitude at a small opening at a center. A transmission waveform is maintained on the element data, and thus a phase difference in the distance direction in a region including continuous points of RF data is uniform. As shown in FIG. 4C, in a speckle, an amplitude and RF data (phase) randomly change irrespective of positions of the openings. As described above, coincidence of the RF data after matching addition or the amplitude image data $PH_a$, $PH_b$ and $PH_c$ at respective small openings is different between the isolated point (minute structure), the continuous surface, and the speckle.

The ultrasound diagnostic apparatus 10 according to the embodiment uses the above described characteristics to allow the isolated point, the continuous surface, and the speckle to be distinguished and extracted, and allow a tissue property to be determined, more specifically, for example, allow a locally strong echo or a continuous surface in a speckle of homogeneous medium (liver parenchyma) to be analyzed to extract a diseased liver with fiber in normal liver parenchyma.

[Determination Processing of Minute Structure]

FIG. 5 is a flowchart showing a determination processing of a minute structure.

First, an ultrasound beam is emitted from the ultrasound probe 300 to the subject OBJ, and an ultrasound echo from the subject OBJ is received. Then, an initial value of an assumed sound speed to the subject OBJ is set (Step S10), and on the basis of the assumed sound speed value, matching addition of element data of the small openings of the ultrasound probe 300 is performed to generate RF data (Step S12).

Next, an absolute value of a difference (delta) between phases of the RF data of the small openings of the ultrasound probe 300 is calculated (Step S14). Then, the absolute value of difference is integrated in a kernel of a predetermined size (for example, a size to circumscribe the isolated point) around each pixel on the element data (Step S16). Then, an integral value of the absolute value of difference calculated around each pixel of the ultrasound probe 300 is compared with a minimum value. When the integral value is smaller than a previously held minimum value, the integral value replaces the minimum value. Thus, the minimum value of the integral value is held for each pixel (Step S18).

Then, the assumed sound speed value is changed by one step (No in Step S20, Step S22), and Steps S12 to S22 are repeated until arithmetical operations at all assumed sound speeds are finished (Yes in Step S20). Then, when the arithmetical operations at all assumed sound speeds are finished (Yes in Step S20), it is determined whether each pixel is a minute structure on the basis of the minimum value of the integral value of each pixel held in Step S18 (Step S24). In Step S24, a pixel with the minimum value of the integral value equal to or smaller than a threshold is determined as a minute structure.

When there are, for example, three kinds of small openings, three kinds of absolute values of difference are calculated. Then, it is allowed that the sum, a minimum value, a maximum value, or a standard deviation of the absolute values of difference is calculated, and when a value calculated using each assumed sound speed value is a predetermined value or less, a pixel with the value is determined as a minute structure.

In addition to the processing in FIG. 5, the minute structure may be determined using a characteristic that a phase difference in a distance direction of element data is uniform in a pixel including a minute structure. For example, when an absolute value of difference is integrated, it may be allowed that a phase difference is taken in the distance direction, and the absolute value of difference is multiplied by a distance direction phase difference or an absolute value of a second derivative value of the distance direction phase difference and then integrated. It may be also allowed that the distance direction phase difference or the absolute value of the second derivative value of the distance direction phase difference is added to the absolute value of difference, and then the absolute value of difference is integrated. The distance direction phase difference is not precisely constant in the distance direction due to attenuation or the like, but in view of uniformity of an azimuth direction (a scanning direction, an arrangement direction of the ultrasound transducers 302), a difference in the distance direction of an azimuth direction phase difference or a difference in the azimuth direction of the distance direction phase difference may be used instead of the distance direction phase difference. Specifically, the absolute value of difference may be integrated after multiplication or addition of an absolute value of the difference in the distance direction of the azimuth direction phase difference or an absolute value of the difference in the azimuth direction of the distance direction phase difference.

It may also allowed that the holding step of the minimum value (Step S18) is omitted, and before the arithmetical operations at all assumed sound speeds are finished (Step S20), a pixel with an integral value equal to or smaller than a threshold is determined as a minute structure, and arithmetical operations at the rest of assumed sound speeds are omitted for the pixel determined as the minute structure.

Also, a minute structure may be determined using the sum of integral values at the respective assumed sound speeds instead of the minimum value.

In the embodiment, the isolated point is extracted noting a characteristic that the phase difference of the RF data of the minute structure at each small opening is small, but a characteristic that the amplitude value is large at all small openings may be used. For example, it may be allowed that an absolute value of an amplitude integrated in a kernel of a predetermined size around each pixel on the element data, or a difference value (or an absolute value of the difference value) between the amplitude and an average of an amplitude obtained from a kernel around the above described kernel is compared at each small opening, and when all the values are equal to or larger than a threshold, or a ratio of the small openings is equal to or smaller than a threshold, the minute structure is determined.

[Determination Processing of Continuous Surface]

Figure 6:
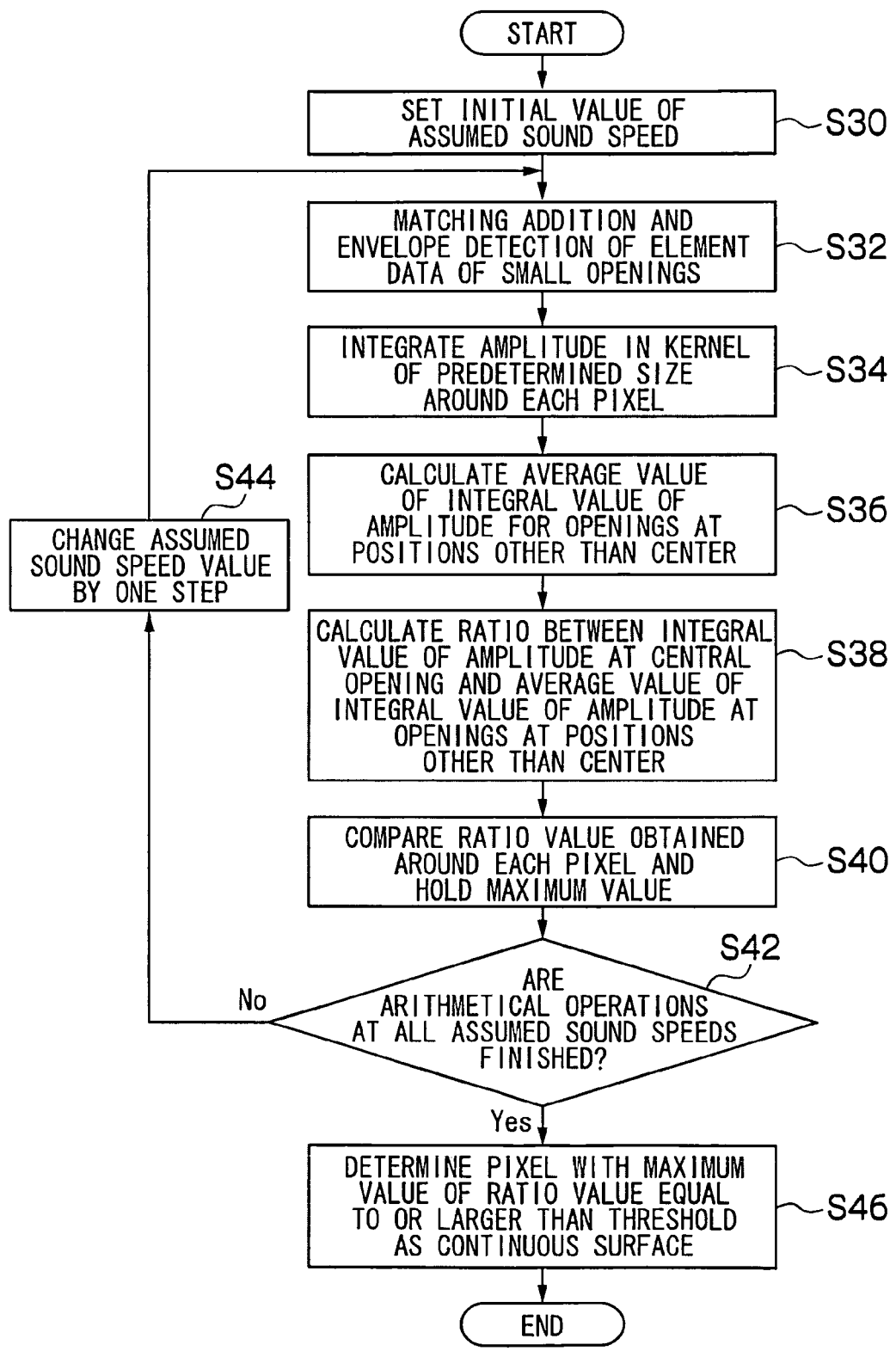
FIG. 6 is a flowchart showing a determination processing of the continuous surface.

FIG. 6 is a flowchart showing a determination processing of a continuous surface.

First, an ultrasound beam is emitted from the ultrasound probe 300 to the subject OBJ, and an ultrasound echo from the subject OBJ is received. Then, an initial value of an assumed sound speed to the subject OBJ is set (Step S30), and on the basis of the assumed sound speed value, matching addition of element data of the small openings of the ultrasound probe 300 is performed to generate RF data. Then, an envelope detection of the RF data is performed to obtain an amplitude of the ultrasound echo (Step S32).

Then, the amplitude obtained from the element data is integrated in a kernel of a predetermined size around each pixel of the ultrasound probe 300 (Step S34). Then, an average value of an integral value of the amplitude in the kernel is calculated for the openings at positions other than the center (Step S36). A ratio between the integral value of the amplitude in the kernel at the central opening and the average value of the integral value of the amplitude at the openings at positions other than the center (that is, {the integral value of the amplitude at the central opening}/{the average value of the integral value of the amplitude at the openings at positions other than the center}) is calculated (Step S38). Then, the value of the ratio obtained around each pixel is compared with a maximum value. When the ratio value is larger than a previously held maximum value, the ratio value replaces the maximum value. Thus, the maximum value of the ratio value is held (Step S40).

Next, the assumed sound speed value is changed by one step (No in Step S42, Step S44), and Steps S32 to S44 are repeated until arithmetical operations at all assumed sound speeds are finished (Yes in Step S42). When the arithmetical operations at all assumed sound speeds are finished (Yes in Step S42), it is determined whether each pixel is a continuous surface on the basis of the maximum value of the ratio value held in Step S40 (Step S46). In Step S46, a pixel with a maximum value of a ratio value equal to or larger than a threshold is determined as a continuous surface.

In the processing in FIG. 6, the continuous surface may be determined on the basis of, for example, a difference between the integral value of the amplitude in the kernel at the central opening and the average value of the integral value of the amplitude at the opening at positions other than the center, instead of the ratio value of the integral value of the amplitude.

In addition to the above described processing, the continuous surface may be determined using a characteristic that a phase difference in a distance direction of element data is uniform at a central opening including a continuous surface. For example, when an amplitude is integrated in a kernel of a predetermined size around each pixel at the central opening, it may be allowed that a phase difference of the RF data is obtained in the distance direction, a distance direction phase difference, an absolute value of a second derivative value of the distance direction phase difference, or an absolute value of a difference in the distance direction of an azimuth direction phase difference is calculated, a coefficient increasing with decreasing phase difference is stored in a table, and the amplitude is multiplied by the coefficient and then integrated.

It may also allowed that the holding step of the maximum value (Step S40) is omitted, an before the arithmetical operations at all assumed sound speeds are finished, a pixel with a ratio value equal to or larger than a threshold is determined as a continuous surface, and arithmetical operations at other assumed sound speeds are omitted for a kernel around the pixel determined as the continuous surface.

Also, a continuous surface may be determined at only one assumed sound speed rather than at all assumed sound speeds.

[Determination of Speckle]

In a region having an amplitude value of a predetermined value or more (high echo) in an amplitude image (B mode image), a region of pixels other than the minute structure determined by the processing in FIG. 5 and the continuous surface determined by the processing in FIG. 6 is determined as a speckle.

[Determination Processing of Mixing Ratio of Minute Structure]

Next, a processing of calculating a mixing ratio of a minute structure and a continuous surface (minute continuous surface) included in a pixel region determined as a speckle by the processes in FIGS. 5 and 6 will be described with reference to FIGS. 7 to 9. FIG. 7 is a flowchart showing a calculation process of the mixing ratio of the minute structure included in the speckle.

First, an ultrasound beam is emitted from the ultrasound probe 300 to the subject OBJ, and an ultrasound echo from the subject OBJ is received. Then, an initial value of an assumed sound speed to the subject OBJ is set (Step S50), and on the basis of the assumed sound speed value, matching addition of element data of the small openings of the ultrasound probe 300 is performed (Step S52).

Next, an absolute value of a differential between phases of the RF data of the small openings of the ultrasound probe 300 is calculated (Step S54). Then, an average value of a predetermined number of data taken (picked up) in ascending order of absolute value of difference is calculated in a kernel of a predetermined size around each pixel (Step S56). Then, the average value obtained around each pixel is compared with a minimum value. When the average value is smaller than the minimum value, the average value replaces a previously held minimum value. Thus, the minimum value is obtained for each pixel and held (Step S58).

Next, the assumed sound speed value is changed by one step (No in Step S60, Step S62), and Steps S52 to S62 are repeated until arithmetical operations at all assumed sound speeds are finished (Yes in Step S60). Then, when the arithmetical operations at all assumed sound speeds are finished (Yes in Step S60), a mixing ratio of the minute structure mixed in the speckle is determined on the basis of the minimum value of the average value held in the Step S58 (Step S64).

FIG. 8A is a graph showing a relationship between the mixing ratio of the minute structure and an average value of the absolute value of difference. FIGS. 8B to 8D are graphs showing relationship between the mixing ratio of the minute structure and a number of data (data count).

As shown in FIGS. 8B to 8D, the number of data (data count) in a region close to zero of the average value of the absolute value of difference increases with increasing mixing ratio of the minute structure. Specifically, the average value of the absolute value of difference decreases with increasing mixing ratio of the minute structure included in the speckle, and the average value of the absolute value of difference increases with decreasing mixing ratio of the minute structure included in the speckle. The ultrasound diagnostic apparatus 10 according to the embodiment stores a table showing the relationship in FIG. 8A in the storage unit 102, and in Step S64, the mixing ratio of the minute mixture in the speckle is determined on the basis of the table.

The mixing ratio of the minute mixture may be determined using, for example, the minimum value of the absolute value of difference instead of the average value of a predetermined number of data.

In addition to the processing in FIG. 7, the mixing ratio of the minute structure may be determined using a characteristic that a phase difference of element data in a distance direction is uniform in a pixel including a minute structure. For example, when amplitude is integrated in kernel of predetermined size around each pixel at the center opening, it may be allowed that a phase difference (distance direction phase difference) is obtained in the distance direction, and the amplitude is multiplied with the distance direction phase difference or an absolute value of a second derivative value of the distance direction phase difference, and then the value after the multiplication is integrated. Alternatively, in this case, before the integration, addition may be performed instead of the multiplication. As an another example, when amplitude is integrated in kernel of predetermined size around each pixel at the center opening, it may be allowed that the amplitude is multiplied with or added to an absolute value of a difference in the distance direction of the azimuth direction phase difference. Further, it may be allowed that a table of coefficients whose value becomes larger as the phase difference becomes larger is stored in advance, and the amplitude is multiplied with a coefficient read from the table and then the multiplication result is integrated.

The mixing ratio of the minute mixture may be also determined using a characteristic that the amplitude value of the minute structure is large at all small openings.

[Determination Processing of Mixing Ratio of Minute Continuous Surface]

FIG. 9 is a flowchart showing a calculation process of a mixing ratio of a minute continuous surface included in the speckle.

First, an ultrasound beam is emitted from the ultrasound probe 300 to the subject OBJ, and an ultrasound echo from the subject OBJ is received. Then, an initial value of an assumed sound speed to the subject OBJ is set (Step S70), and on the basis of the assumed sound speed value, matching addition of element data of the small openings of the ultrasound probe 300 is performed to generate RF data. Then, an envelope detection of the RF data is performed to obtain an amplitude of the ultrasound echo (Step S72).

Then, the amplitude obtained from the element data is integrated in a kernel of a predetermined size around each pixel of the ultrasound probe 300 (Step S74). Then, an average value of an integral value of the amplitude in the kernel is calculated for the openings at positions other than the center (Step S76). A ratio between the integral value of the amplitude in the kernel at the central opening and the average value of the integral value of the amplitude at the openings at positions other than the center is calculated (Step S78).

Then, an average value of data of a predetermined number in ascending order of average value of the ratio value obtained in Step S78 is calculated in the kernel of a predetermined size around each pixel (Step S80). Then, the average value of the ratio value obtained around each pixel is compared with a maximum value. When the average value of the ratio value is larger than a previously held maximum value, the ratio value replaces the maximum value. Thus, the maximum value is obtained for each central pixel and held (Step S82).

Then, the assumed sound speed value is changed by one step (No in Step S84, Step S86), and Steps S72 to S86 are repeated until arithmetical operations at all assumed sound speeds are finished (Yes in Step S84). Then, when the arithmetical operations at all assumed sound speeds are finished (Yes in Step S84), a mixing ratio of the minute continuous surface mixed in the speckle is determined on the basis of the maximum value of the average value of the ratio value held in Step S82 (Step S88). The number of data on a large side of the average value of the ratio values increases with increasing mixing ratio of the minute continuous surface. Specifically, the average value of the ratio values increases with increasing mixing ratio of the minute continuous surface included in the speckle, and the average value of the ratio values decreases with decreasing mixing ratio of the minute continuous surface included in the speckle. The ultrasound diagnostic apparatus 10 according to the embodiment stores a table showing the relationship between the average value of the ratio value and the mixing ratio of the minute continuous surface in the storage unit 102, and in Step S88, the mixing ratio of the minute continuous surface in the speckle is determined on the basis of the table.

The mixing ratio of the minute continuous surface may be determined using a difference between the integral value of the amplitude at the central opening in the kernel and the average value of the integral value of the amplitude at the openings at positions other than the center, or an absolute value of the difference, instead of the above described ratio value.

In the processing in FIG. 9, the average value of the predetermined number of the ratio value is used, but the maximum value of the ratio value may be used instead of the average value.

In addition to the above described processing, the continuous surface may be determined using a characteristic that a phase difference in a distance direction of element data is uniform at the central opening including a continuous surface. For example, when an amplitude is integrated in a kernel of a predetermined size around each pixel at the central opening, it may be allowed that a phase difference is taken in the distance direction, a distance direction phase difference, an absolute value of a second derivative value of the distance direction phase difference, or an absolute value of a difference in the distance direction of an azimuth direction phase difference is calculated, a coefficient increasing with decreasing phase difference is stored in a table, and the amplitude is multiplied by the coefficient and then integrated.

The determination result of the property of the reflector by each of the above described processes is output to and displayed on the display unit 104. When the display mode of the display unit 106 is set to the determination result display mode, the determination result of the property of the reflector is displayed so as to be superimposed on the amplitude image or placed with the amplitude image side by side. In the determination result display mode, for example, the minute structure, the continuous surface, and the speckle are displayed by changing color or brightness. The mixing ratio of the minute structure or the minute continuous surface may be displayed by changing color or brightness of the amplitude image. The mode of the display of the determination result may be switched by an operation input from the operation input unit 200.

The embodiments may be applied to a case where the ultrasound transducers are two-dimensionally arranged, or the ultrasound transducers are arranged in any curved shape rather than a planar shape.

According to the embodiment, matching addition of the element data of the small openings is performed, and the differences in characteristics between the minute structure, the continuous surface, and the speckle in RF data and amplitude image are used, thereby allowing the minute structure, the continuous surface, and the speckle to be distinguished, which have been difficult to distinguish by a conventional technique based on an amplitude value or a shape of an amplitude image. This also allows a tissue property to be determined such as a mixing ratio of a minute structure and a minute continuous surface in a speckle.

What is claimed is:

1. An ultrasound diagnostic apparatus comprising:
   an ultrasound probe including a plurality of ultrasound transducers configured to transmit ultrasound to a subject and to receive the ultrasound reflected by the subject to output an element data;
   an arithmetical operation device configured to perform matching addition of element data of a plurality of divided apertures obtained by dividing an aperture provided in the ultrasound probe and on the basis of the element data output from the ultrasound transducers; and
   a determination device configured to determine a property of a reflector which reflects the ultrasound in the subject based on characteristics of an ultrasonic echo reflected by a minute structure or an ultrasonic echo reflected by a continuous surface detected in at least one of RF data and an amplitude image which are obtained by the matching addition of the element data of the divided apertures, or characteristics of an ultrasonic echo reflected by a speckle detected in the RF data.

2. The ultrasound diagnostic apparatus according to claim 1, wherein the determination device determines a region where phases of the RF data obtained by the matching addition of the element data of the divided apertures coincide with each other, as a minute structure.

3. The ultrasound diagnostic apparatus according to claim 1, wherein the determination device determines a region where phases of the RF data obtained by the matching addition of the element data of the divided apertures coincide with each other, and where a change in a scanning direction or a distance direction of the phase of the RF data, a change in the scanning direction of a phase difference in the distance direction of the ultrasound probe, or a change in the distance direction of the phase difference is a predetermined value or less, irrespective of positions of the divided apertures, as a minute structure.

4. The ultrasound diagnostic apparatus according to claim 1, wherein when, in a predetermined-sized region, an amplitude at a divided aperture located at a center of the predetermined-sized region of the element data is larger by a predetermined value or more than an amplitude at divided apertures at positions other than the center, the determination device determines the predetermined-sized region as a continuous surface.

5. The ultrasound diagnostic apparatus according to claim 1, wherein when, in a predetermined-sized region, an amplitude at a divided aperture located at a center of the predetermined-sized region of the element data is larger by a first predetermined value or more than an amplitude at divided apertures at positions other than the center, and a change in a scanning direction or a distance direction of the phase of the RF data, a change in the scanning direction of a phase difference in the distance direction of the ultrasound probe, or a change in the distance direction of the phase difference, of the divided aperture located at the center is a second predetermined value or less, irrespective of positions of the divided apertures, the determination device determines the predetermined-sized region as a continuous surface.

6. The ultrasound diagnostic apparatus according to claim 1, wherein the determination device determines a region where the amplitude or the RF data randomly changes irrespective of the positions of the divided apertures, as a speckle.

7. The ultrasound diagnostic apparatus according to claim 6, wherein the determination device determines a mixing ratio of minute structures included in the speckle based on characteristics of an ultrasonic echo reflected by the minute structures included in the speckle detected in the RF data or the amplitude image which are obtained by the matching addition of the element data of the divided aperture.

8. The ultrasound diagnostic apparatus according to claim 6, wherein the determination device determines a mixing ratio of continuous surfaces included in the speckle based on characteristics of an ultrasonic echo reflected by the continuous surfaces included in the speckle detected in the RF data or the amplitude image which are obtained by the matching addition of the element data of the divided aperture.

9. The ultrasound diagnostic apparatus according to claim 1, further comprising:
   a display device configured to display a determination result of the property of the reflector determined by the determination device.

10. The ultrasound diagnostic apparatus according to claim 9, wherein the display device displays the determination result of the property of the reflector in a manner that the determination result is superimposed on the amplitude image or placed with the amplitude image side by side.

11. The ultrasound diagnostic apparatus according to claim 9, further comprising:
    a display mode switching switches configured to switch a display mode between a first display mode in which the amplitude image is displayed alone and a second display mode in which the determination result of the property of the reflector is displayed.

12. An ultrasound diagnostic method comprising:
    an arithmetical operation step of performing matching addition of element data of a plurality of divided apertures obtained by dividing an provided in an ultrasound probe and on the basis of element data output from the ultrasound probe, the ultrasound probe including a plurality of ultrasound transducers which transmit ultrasound to a subject and receive the ultrasound reflected by the subject to output the element data; and
    a determination step of determining a property of a reflector which reflects the ultrasound in the subject based on characteristics of an ultrasonic echo reflected by a minute structure or an ultrasonic echo reflected by a continuous surface detected in at least one of RF data and an amplitude image which are obtained by the matching addition of the element data of the divided apertures, or characteristics of an ultrasonic echo reflected by a speckle detected in the RF data.

13. The ultrasound diagnostic method according to claim 12, wherein a region where phases of the RF data obtained by the matching addition of the element data of the divided apertures coincide with each other is determined as a minute structure in the determination step.

14. The ultrasound diagnostic method according to claim 12, wherein a region where phases of the RF data obtained by the matching addition of the element data of the divided apertures coincide with each other, and where a change in a scanning direction or a distance direction of the phase of the RF data a change in the scanning direction of a phase difference in the distance direction of the ultrasound probe, or a change in the distance direction of the phase difference is a predetermined value or less irrespective of positions of the divided apertures is determined as a minute structure in the determination step.

15. The ultrasound diagnostic method according to claim 12, wherein when, in a predetermined-sized region, an amplitude at a divided aperture located at a center of the predetermined-sized region of the element data is larger by a predetermined value or more than an amplitude at divided apertures at positions other than the center, the predetermined-sized region is determined as a continuous surface in the determination step.

16. The ultrasound diagnostic method according to claim 12, wherein when, in a predetermined-sized region, an amplitude at a divided aperture located at a center of the predetermined-sized region of the element data is larger by a first predetermined value or more than an amplitude at divided apertures at positions other than the center, and a change in a scanning direction or a distance direction of the phase of the RF data, a change in the scanning direction of a phase difference in the distance direction of the ultrasound probe, or a change in the distance direction of the phase difference, of the divided aperture located at the center is a second predetermined value or less, irrespective of positions of the divided apertures, the predetermined-sized region is determined as a continuous surface in the determination step.

17. The ultrasound diagnostic method according to claim 12, wherein a region where the amplitude or the RF data randomly changes irrespective of the positions of the divided apertures is determined as a speckle in the determination step.

18. The ultrasound diagnostic method according to claim 17, further comprising
a step of determining a mixing ratio of minute structures included in the speckle based on characteristics of an ultrasonic echo reflected by the minute structures included in the speckle detected in the RF data or the amplitude image which are obtained by the matching addition of the element data of the divided aperture.

19. The ultrasound diagnostic method according to claim 17, further comprising
a step of determining a mixing ratio of a continuous surfaces included in the speckle based on characteristics of an ultrasonic echo reflected by the continuous surfaces included in the speckle detected in the RF data or the amplitude image which are obtained by the matching addition of the element data of the divided aperture.

20. The ultrasound diagnostic method according to claim 12, further comprising
a display step of displaying a determination result of the property of the reflector on a display device determined in the determination step.

21. The ultrasound diagnostic apparatus according to claim 1, wherein
a number of the ultrasound transducers which constitute the divided aperture is smaller than a number of all elements of the ultrasound probe.

22. The ultrasound diagnostic method according to claim 12, wherein
a number of the ultrasound transducers which constitute the divided aperture is smaller than a number of all elements of the ultrasound probe.

23. The ultrasound diagnostic apparatus according to claim 1, wherein
the minute structure is a calcified region in the subject.

24. The ultrasound diagnostic method according to claim 12, wherein
the minute structure is a calcified region in the subject.

* * * * *